United States Patent
Qiu

(10) Patent No.: US 10,510,148 B2
(45) Date of Patent: Dec. 17, 2019

(54) SYSTEMS AND METHODS FOR BLOCK BASED EDGEL DETECTION WITH FALSE EDGE ELIMINATION

(71) Applicant: Hong Kong Applied Science and Technology Research Institute Co., Ltd., Shatin, New Territories (HK)

(72) Inventor: Tian Qiu, Shatin (HK)

(73) Assignee: Hong Kong Applied Science and Technology Research Institute Co., Ltd., Shatin (HK)

(*) Notice: Subject to any disclaimer, the term of this patent is extended or adjusted under 35 U.S.C. 154(b) by 88 days.

(21) Appl. No.: 15/845,846

(22) Filed: Dec. 18, 2017

(65) Prior Publication Data

US 2019/0188856 A1    Jun. 20, 2019

(51) Int. Cl.
*G06T 7/13* (2017.01)
*G06T 7/11* (2017.01)
*G06T 7/136* (2017.01)

(52) U.S. Cl.
CPC .......... *G06T 7/13* (2017.01); *G06T 7/11* (2017.01); *G06T 7/136* (2017.01); *G06T 2207/10028* (2013.01); *G06T 2207/20021* (2013.01)

(58) Field of Classification Search
CPC ... G06T 7/13; G06T 7/136; G06T 7/11; G06T 2207/10028; G06T 2207/20021
See application file for complete search history.

(56) References Cited

U.S. PATENT DOCUMENTS

| 7,843,448 | B2 | 11/2010 | Wheeler et al. | |
| 8,610,706 | B2 | 12/2013 | Zhou et al. | |
| 9,014,265 | B1* | 4/2015 | Rintaluoma | H04N 19/14 |
| | | | | 375/240.12 |
| 9,245,382 | B2 | 1/2016 | Zhou et al. | |
| 2007/0130239 | A1 | 6/2007 | Wheeler et al. | |
| 2007/0136408 | A1 | 6/2007 | Wheeler et al. | |
| 2010/0134517 | A1 | 6/2010 | Saikaly et al. | |

(Continued)

FOREIGN PATENT DOCUMENTS

| CN | 17220550 A | 1/2006 |
| CN | 101877128 A | 11/2010 |

(Continued)

OTHER PUBLICATIONS

Nalwa, V. S., et al. "Edgel Aggregation and Edge Description," Computer Vision, Graphics, and Image Processing 40, No. 1 (1987) 79-94, 16 pages.

(Continued)

*Primary Examiner* — John W Lee
(74) *Attorney, Agent, or Firm* — Norton Rose Fulbright US LLP

(57) ABSTRACT

Methods and systems which provide object edge image representation generation using block based edgel techniques implementing post edgel detection processing to eliminate false edges are described. Embodiments subdivide image data (e.g., image point clouds) to facilitate separate edgel detection processing of a plurality of sub-blocks of the image data. A false edge elimination algorithm of embodiments is applied in recombining the object edge image representation sub-blocks resulting from the sub-block edgel detection processing to eliminate false edge artifacts associated with use of block based edgel detection.

15 Claims, 11 Drawing Sheets

(56) References Cited

U.S. PATENT DOCUMENTS

| | | | |
|---|---|---|---|
| 2012/0121166 A1 | 5/2012 | Ko et al. | |
| 2013/0077877 A1* | 3/2013 | Uchiyama | G06K 9/36 382/232 |
| 2013/0156329 A1* | 6/2013 | Szeliski | G06K 9/00214 382/218 |
| 2013/0162806 A1 | 6/2013 | Ding et al. | |
| 2017/0084080 A1 | 3/2017 | Huang et al. | |

FOREIGN PATENT DOCUMENTS

| | | |
|---|---|---|
| CN | 101908230 A | 12/2010 |
| CN | 102016917 A | 4/2011 |
| CN | 103017677 A | 4/2013 |
| CN | 103175469 A | 6/2013 |
| CN | 103198444 A | 7/2013 |
| CN | 103729846 A | 4/2014 |
| CN | 104063860 A | 9/2014 |
| CN | 104463851 A | 3/2015 |
| CN | 105512665 A | 4/2016 |
| CN | 105551016 A | 5/2016 |
| CN | 105627950 A | 6/2016 |
| CN | 106897995 A | 6/2017 |
| CN | 107038707 A | 8/2017 |
| EP | 2785493 A1 | 10/2014 |
| JP | 2013134255 A | 7/2013 |
| WO | WO-2013043329 A1 | 3/2013 |

OTHER PUBLICATIONS

Sankaranarayanan, J., et al. "A Fast k-Neighborhood Algorithm for Large Point-Clouds," SPBG, 2006, 11 pages.

Bendels, G. H., et al. "Detecting Holes in Point Set Surfaces," WSCG 2006 International Programme Committee, vol. 14, 2006, 8 pages.

Choi, C., et al. "RGB-D Edge Detection and Edge-based Registration," Intelligent Robots and Systems (IROS), 2013 IEEE/RSJ International Conference on IEEE, 2013, 8 pages.

Qin, R., et al. "3D Change Detection at Street Level Using Mobile Laser Scanning Point Clouds and Terrestrial Images," ISPRS Journal of Photogrammetry and Remote Sensing 90, 2014, 25 pages.

Hackel, T., et al. "Contour Detection in Unstructured 3D Point Clouds," Proceedings of the IEEE Conference on Computer Vision and Pattern Recognition. 2016, 9 pages.

Boulaassal, H., et al. "Automatic Extraction of Planar Clusters and Their Contours on Building Facades Recorded by Terrestrial Laser Scanner," International Journal of Architectural Computing 7.1, 2009, 20 pages.

Ni, H., et al. "Edge Detection and Feature Line Tracing in 3D-point Clouds by Analyzing Geometric Properties of Neighborhoods," Remote Sensing 8.9, 2016, 710, 20 pages.

Ilamchezhian, J., et al. "An Efficient Parallel Approach for 3D Point Cloud Image Segmentation Using OpenMP," Digital Image Processing vol. 5, No. 5, May 2013, 229-238, 10 pages.

Teutsch, C., et al. "A Parallel Point Cloud Clustering Algorithm for Subset Segmentation and Outlier Detection," In Society of Photo-Optical Instrumentation Engineers (SPIE) Conference Series, vol. 8085, 2011, 6 pages.

Aldoma, A., et al. "Tutorial: Point Cloud Library: Three-Dimensional Object Recognition and 6 DoF Pose Estimation," IEEE Robotics & Automation Magazine 19, No. 3, p. 80-91, Sep. 2012, 12 pages.

International Search Report issued for PCT/CN2018/072160; dated Sep. 5, 2018; 10 pages.

* cited by examiner

SYSTEMS AND METHODS FOR BLOCK BASED EDGEL DETECTION WITH FALSE EDGE ELIMINATION

TECHNICAL FIELD

The present invention relates generally to image processing and, more particularly, to block based detection of edgels in image point clouds implementing post edgel detection processing to eliminate false edges.

BACKGROUND OF THE INVENTION

Various images, including two-dimensional (2D) and three-dimensional (3D) images as may be captured by motion or still image cameras, tomographic imaging devices, magnetic imaging devices, seismic imaging devices, etc., are commonly used in a number of fields, including manufacturing, medical, security, energy, and construction. For example, such images may be used for quality control analysis, medical diagnosis, facial recognition, geological exploration, component stress and load analysis, and/or other image based applications.

Processor-based (e.g., computer-based) processing of such images may be utilized, such as for providing machine vision, object recognition, edge detection, depth mapping, etc., in providing various image based applications. The images used in such processor-based processing may comprise relatively large data sets. For example, a point cloud representing a 3D image of an object or objects may be appreciably large, such as on the order of megabytes or gigabytes. Accordingly, techniques for extracting relevant features from images (e.g., edges of objects represented within an image) have often been used to both reduce the size of the image data and to provide an image representation having the features therein presented in a manner facilitating image processing for one or more image based application.

A number of techniques have been used to identify edges represented within a point cloud for an image. For example, the techniques described in Bendels, Gerhard H., Ruwen Schnabel, and Reinhard Klein, "Detecting Holes in Point Set Surfaces," WSCG 2006 International Programme Committee (2006); Hackel, Timo, Jan D. Wegner, and Konrad Schindler, "Contour detection in unstructured 3d point clouds," Proceedings of the IEEE Conference on Computer Vision and Pattern Recognition (2016); Boulaassal, H., T. Landes, and P. Grussenmeyer, "Automatic extraction of planar clusters and their contours on building façades recorded by terrestrial laser scanner," International Journal of Architectural Computing 7.1, pp 1-20, (2009); and Ni, Huan, et al., "Edge detection and feature line tracing in 3d-point clouds by analyzing geometric properties of neighborhoods," Remote Sensing 8.9, p. 710, (2016), the disclosures of which are incorporated herein by reference, detect edges within the images using edgel (i.e., an edgel is a pixel in an image or a voxel in a 3D point cloud that is recognized as the edge of something represented in the image) detection algorithms. These techniques operate to extract edgel points in 3D point clouds, thus providing an image rendition (referred to herein as object edge image representation) having an amount of data that is significantly reduced as compared to the original point cloud but which nevertheless preserves the main features of the objects represented in the images.

Such edgel image processing techniques, however, generally require appreciable processing time and resources to produce object edge image representations. Accordingly, extraction of the main features of objection within large or complex images using typical existing edgel image processing techniques may require an unacceptable amount of time and/or processing resources, and may not even be possible or practical in certain situations or using particular processor-based systems. For example, although an object edge image representation may facilitate particular image based applications, such as object recognition and machine vision, the time required to produce object image representations using traditional edgel image processing techniques may make it impractical to implement in real time (e.g., for object identification in real-time moving images). Moreover, the processing resources required to produce object image representations using traditional edgel image processing techniques may make it impractical to implement on the systems available in any particular situation (e.g., robotic pick and place systems deployed in high speed sorting or assembly lines).

BRIEF SUMMARY OF THE INVENTION

The present invention is directed to methods and systems which provide object edge image representation generation using block based edgel techniques implementing post edgel detection processing to eliminate false edges. Through block based edgel detection techniques according to the concepts herein, embodiments of the invention subdivide image data (e.g., image point clouds) to facilitate separate, whether in parallel or serially, edgel detection processing of a plurality of sub-blocks of the image data. A false edge elimination algorithm of embodiments is applied in recombining the object edge image representation sub-blocks resulting from the sub-block edgel detection processing to eliminate false edge artifacts associated with use of block based edgel detection.

As can be appreciated from the foregoing, embodiments of the invention facilitate rapid, even real-time, generation of object edge image representations. Additionally, embodiments facilitate generation of object edge image representations using processor platforms having less computing resources than those required for traditional edge detection techniques. Moreover, the foregoing is achieved according to embodiments herein substantially without introducing false edge artifacts into the resulting object edge image representation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIGS. 6A, 6B-1, 6B-2, 6C-1, and 6C-2 illustrate subdivision of image data and separate processing of sub-blocks thereof for object edge image representation generation using block based edgel techniques implementing post edgel detection processing to eliminate false edges according to embodiments of the invention.

DETAILED DESCRIPTION OF THE INVENTION

Figure 1:
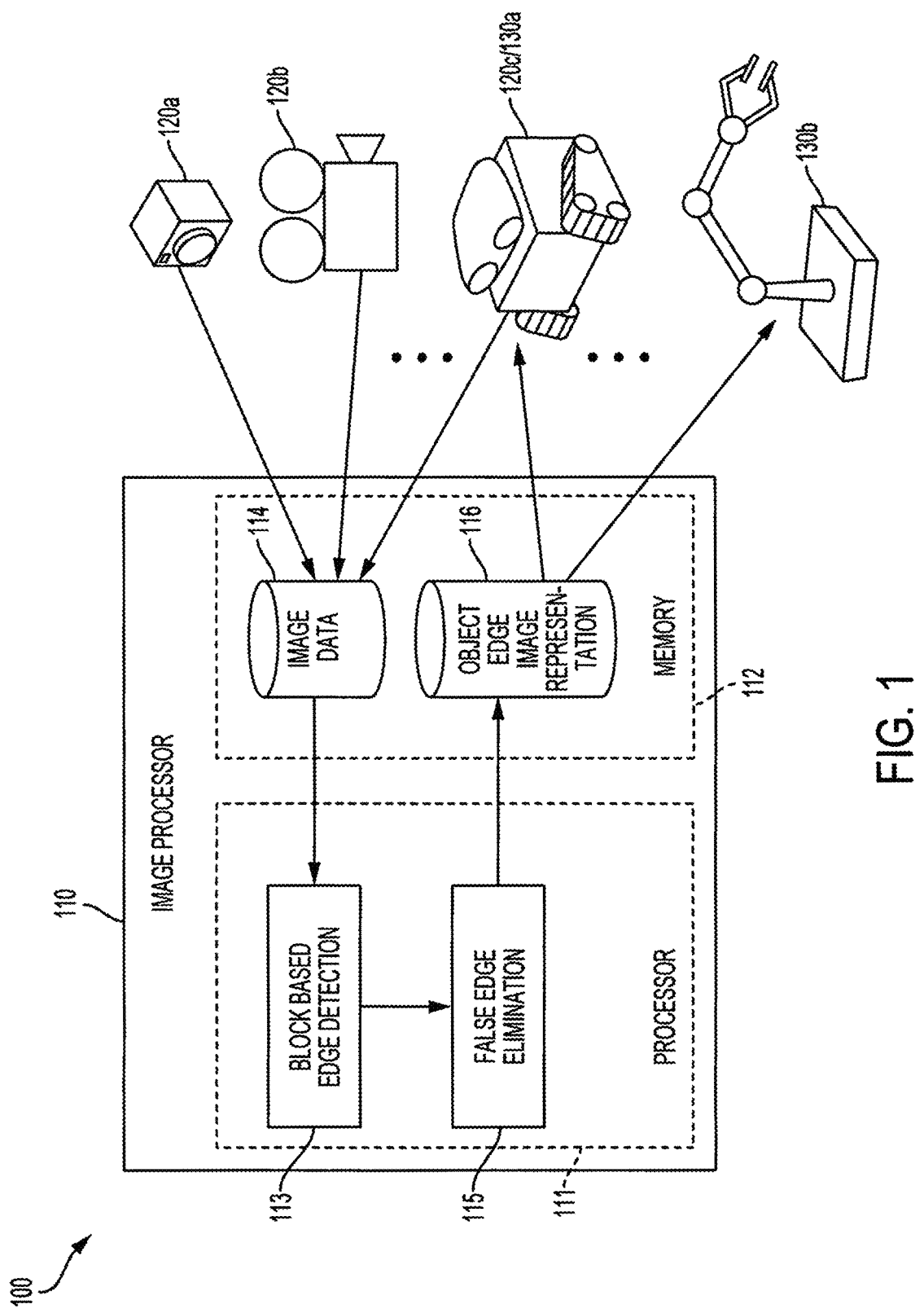
FIG. 1 shows a block diagram of a system configured to provide object edge image representation generation using block based edgel techniques implementing post edgel detection processing to eliminate false edges according to embodiments of the invention.

FIG. 1 shows a block diagram of a system configured to provide object edge image representation generation using block based edgel techniques implementing post edgel detection processing to eliminate false edges according to embodiments of the invention. System 100 of the illustrated embodiment includes image processor 110 having block based edgel detection logic 112 and false edge elimination logic 115 cooperatively operable to process image data (e.g., one or more image point clouds) of image data database 114 and generate object edge image representations of object edge image representation database 116 therefrom.

Image processor 110 may comprise various forms of processor-based systems in accordance with embodiments of the invention. For example, image processor 110 may comprise a general purpose computer system (e.g., a personal computer (PC), a server, a tablet device, etc.) and/or a special purpose processor platform (e.g., application specific integrated circuit (ASIC), system on a chip (SoC), etc.). The illustrated embodiment of image processor 110 comprises processor 111 (e.g., one or more processors of the CORE family of processors available from Intel, one or more processors of the ATOM processor family of processors available from Intel, one or more processors of the POWERPC family of processors available from IBM, one or more ASIC processor implementations, etc.) and memory 112 (e.g., one or more semiconductor memory device, read only memory (ROM), flash memory, erasable ROM (EROM), compact disk ROM (CD-ROM), optical disk, hard disk, etc.). Memory 112 of embodiments comprises a processor readable medium configured to store, in addition to image data database 114 and object edge image representation database 116, one or more instruction sets (e.g., software, firmware, etc.) which, when executed by a processor (e.g., one or more processors of processor 111), perform tasks and functions as described herein. For example, block based edgel detection logic 113 and false edge elimination logic 115 may comprise code segments stored by memory 112 which when executed by processor 111 define logic operable in accordance with the concepts herein to provide object edge image representation generation using block based edgel techniques implementing post edgel detection processing to eliminate false edges.

Figure 2:
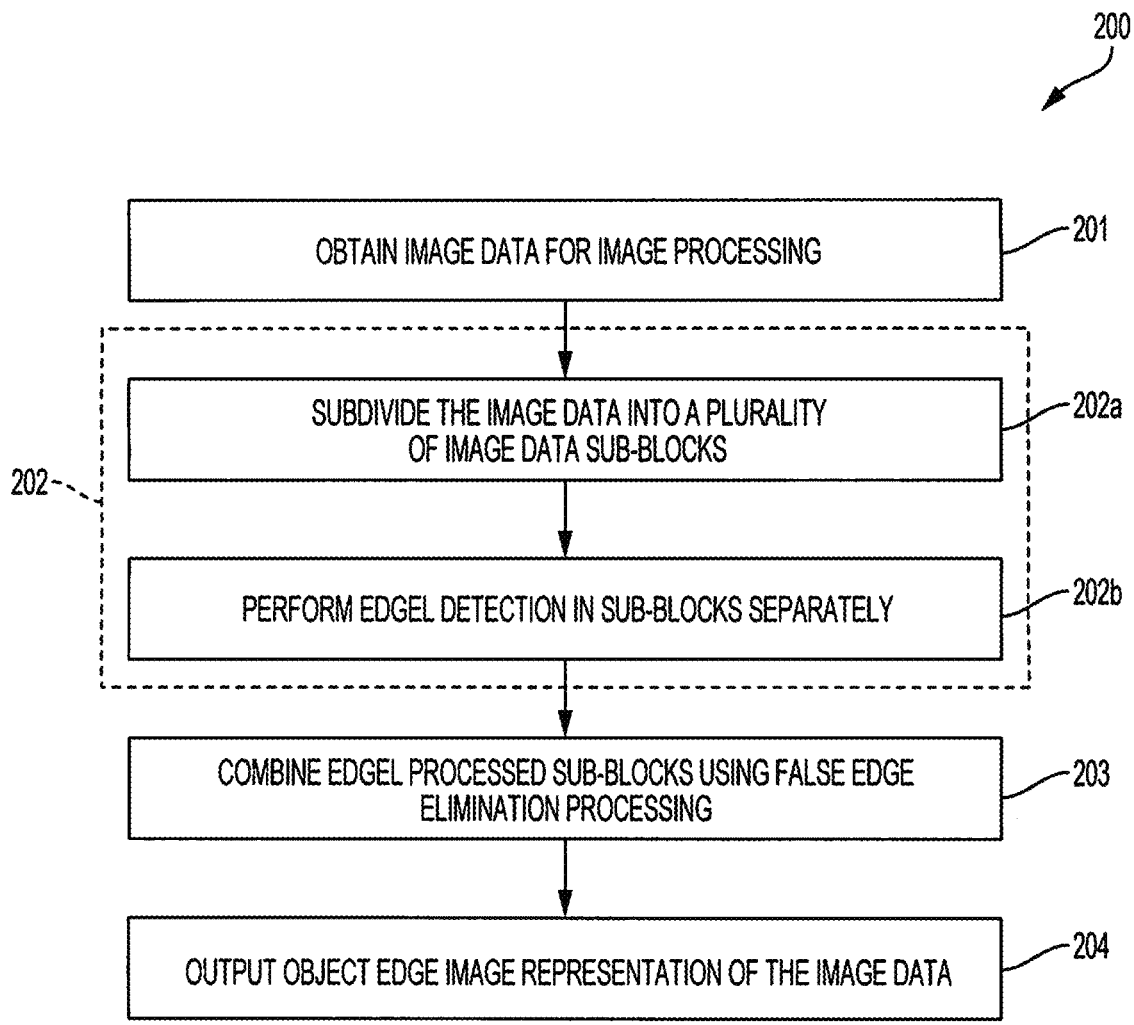
FIG. 2 shows a high level flow diagram of operation of an image processor providing object edge image representation generation using block based edgel detection and post edgel detection processing to eliminate false edges according to embodiments of the invention.

FIG. 2 shows a high level flow diagram of operation of an image processor providing object edge image representation generation using block based edgel detection and post edgel detection processing to eliminate false edges. For example, the functions of flow 200 shown in FIG. 2 may be performed by image processor 110 of FIG. 1 for providing block based edgel detection with false edge elimination according to embodiments herein.

At block 201 of the embodiment illustrated in FIG. 2 image data is obtained for image processing. In operation according to embodiments of system 100, one or more imaging devices (e.g., imaging devices 120a-120c, such as may comprise still image cameras, motion picture cameras, automation system imaging equipment, etc.) may capture images and provide image data (e.g., in the form of data clouds) to image data database 114 for processing by image processor 110. The image data may be captured for image processing to provide object recognition, quality control analysis, automated pick and place operation, medical diagnosis, motion detection, security analysis, geological analysis, stress and load analysis, etc. Irrespective of the particular ultimate use of the image data, operation according to block 201 of flow 200 of the illustrated embodiment obtains the data of one or more images for which one or more object edge image representation is to be generated. For example, a point cloud corresponding to the captured image of FIG. 3A containing an open flame.

The functionality provided by block 202 of flow 200 provides object edge image representation generation using a block based edgel detection process, such as may be implemented by block based edgel detection logic 113 of FIG. 1. Through the block based edgel detection process of the illustrated embodiment, the image data is subdivided to facilitate use of multiple edgel detection processing instances. Accordingly, at block 202a the image data is subdivided into a plurality of sub-blocks of the image data, as described in further detail below. It should be appreciated that the sub-blocks of the image data are arbitrary with respect to the content or objects represented within the image data (i.e., the surfaces of objects represented in the image may travers the borders or edges of a number of the sub-blocks). At block 202b, edgel detection is performed for each of the image data sub-blocks separately. For example, one or more edgel detection technique, such as those described in Bendels, Gerhard H., Ruwen Schnabel, and Reinhard Klein, "Detecting Holes in Point Set Surfaces," WSCG 2006 International Programme Committee (2006); Hackel, Timo, Jan D. Wegner, and Konrad Schindler, "Contour detection in unstructured 3d point clouds," Proceedings of the IEEE Conference on Computer Vision and Pattern Recognition (2016); Boulaassal, H., T. Landes, and P. Grussenmeyer, "Automatic extraction of planar clusters and their contours on building façades recorded by terrestrial laser scanner," International Journal of Architectural Computing 7.1, pp 1-20, (2009); and Ni, Huan, et al., "Edge detection and feature line tracing in 3d-point clouds by analyzing geometric properties of neighborhoods," Remote Sensing 8.9, p. 710, (2016), may be utilized with respect to each image data sub-block to detect edgels therein. It should be appreciated, however, that the edgel detection of each such sub-block is performed separately (e.g., a plurality of sub-blocks may be processed for edgel detection in parallel, a plurality of sub-blocks may be processed for edgel detection serially, or a combination of parallel and serial edgel detection processing may be performed with respect to the sub-blocks). Accordingly, a plurality of edgel processed sub-blocks are provided by operation of block 202 of the illustrated embodiment of flow 200.

At block 203 of flow 200 illustrated in FIG. 2 the edgel processed sub-blocks are combined for forming an object edge image representation of the image data using a false edge elimination process, such as may be implemented by false edge elimination logic 115 of FIG. 1. For example, a false edge elimination algorithm of embodiments is applied in recombining the object edge image representation sub-blocks resulting from the sub-block edgel detection processing to eliminate false edge artifacts associated with use of block based edgel detection. The false edge elimination algorithm implemented according to embodiments may utilize neighbor point analysis techniques, as described in further detail below, for identifying and/or eliminating false edges.

Figure 3A:
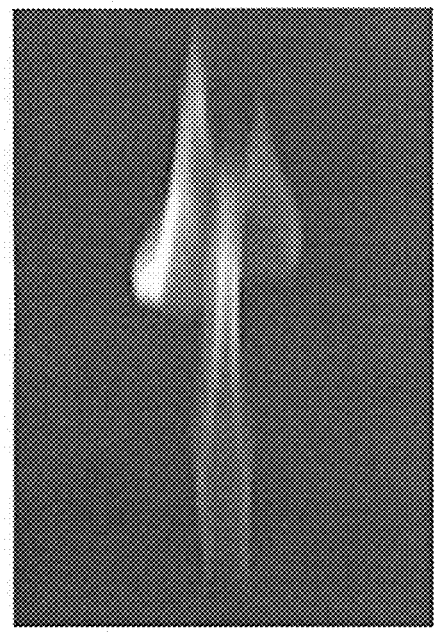
FIG. 3A shows an exemplary image as may be processed for object edge image representation generation using block based edgel techniques implementing post edgel detection processing to eliminate false edges according to embodiments of the invention.
Figure 3B:
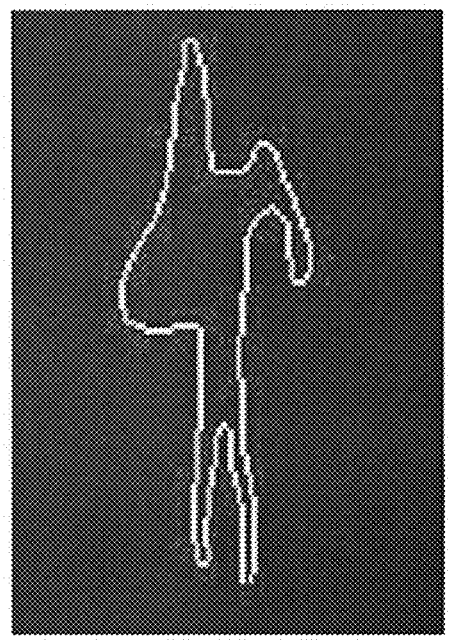
FIG. 3B shows an object edge image representation as may be generated from the image of FIG. 3A using block based edgel techniques implementing post edgel detection processing to eliminate false edges according to embodiments of the invention.

After the edgel processed sub-blocks of the image data are combined, having false edge artifacts of the block based edgel detection process eliminated therefrom, block 204 of the illustrated embodiment of flow 200 provides output of the resulting object edge image representation of the image data, such as may comprise the edgel image of FIG. 3B containing edges of the object (open flame) contained in the image data of FIG. 3A. For example, false edge elimination logic 115 of FIG. 1 may operate to output the object edge image representation generated by operation of flow 200 to object edge image representation database 116. One or more such object edge image representations may be utilized various image based applications, such as object recognition, quality control analysis, automated pick and place operation, medical diagnosis, motion detection, security analysis, geological analysis, stress and load analysis, etc. (e.g., automation devices 130*a*-130*b*, such as may comprise machine vision systems, robotic manipulators, etc.).

Figure 4:
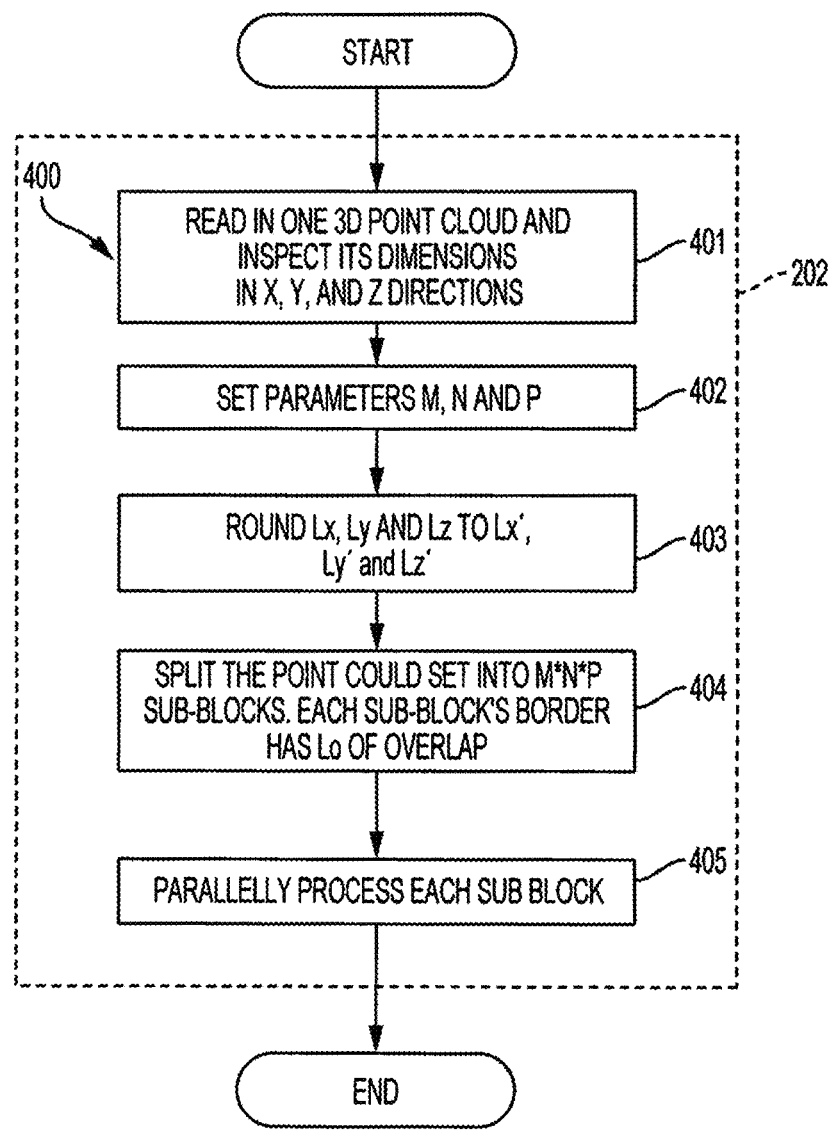
FIG. 4 shows a flow diagram illustrating operation of an image processor providing block based edgel detection processing according to embodiments of the invention.
Figure 5:
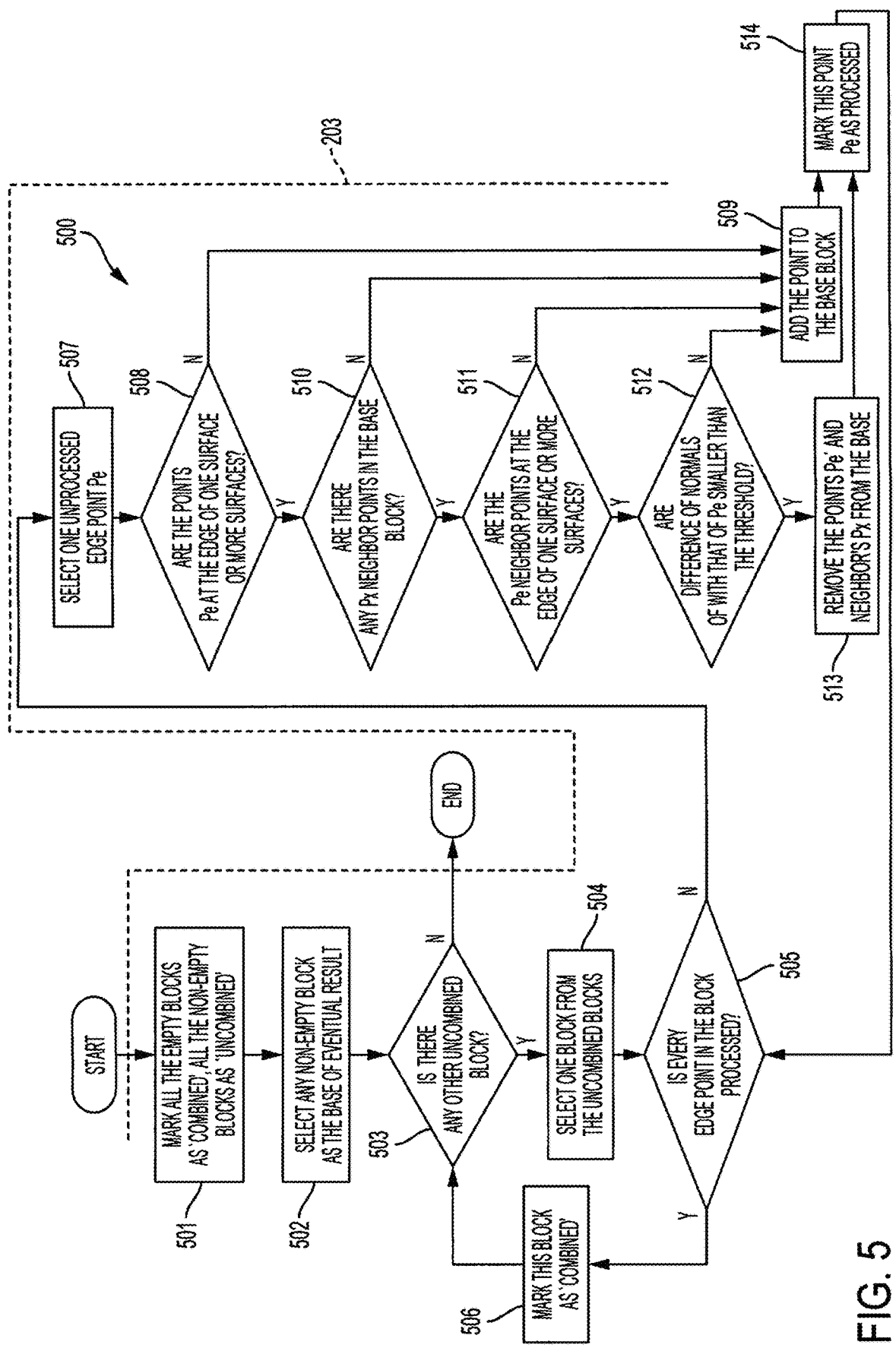
FIG. 5 shows a flow diagram illustrating operation of an image processor providing post edgel detection processing to eliminate false edges according to embodiments of the invention.
Figure 6A:
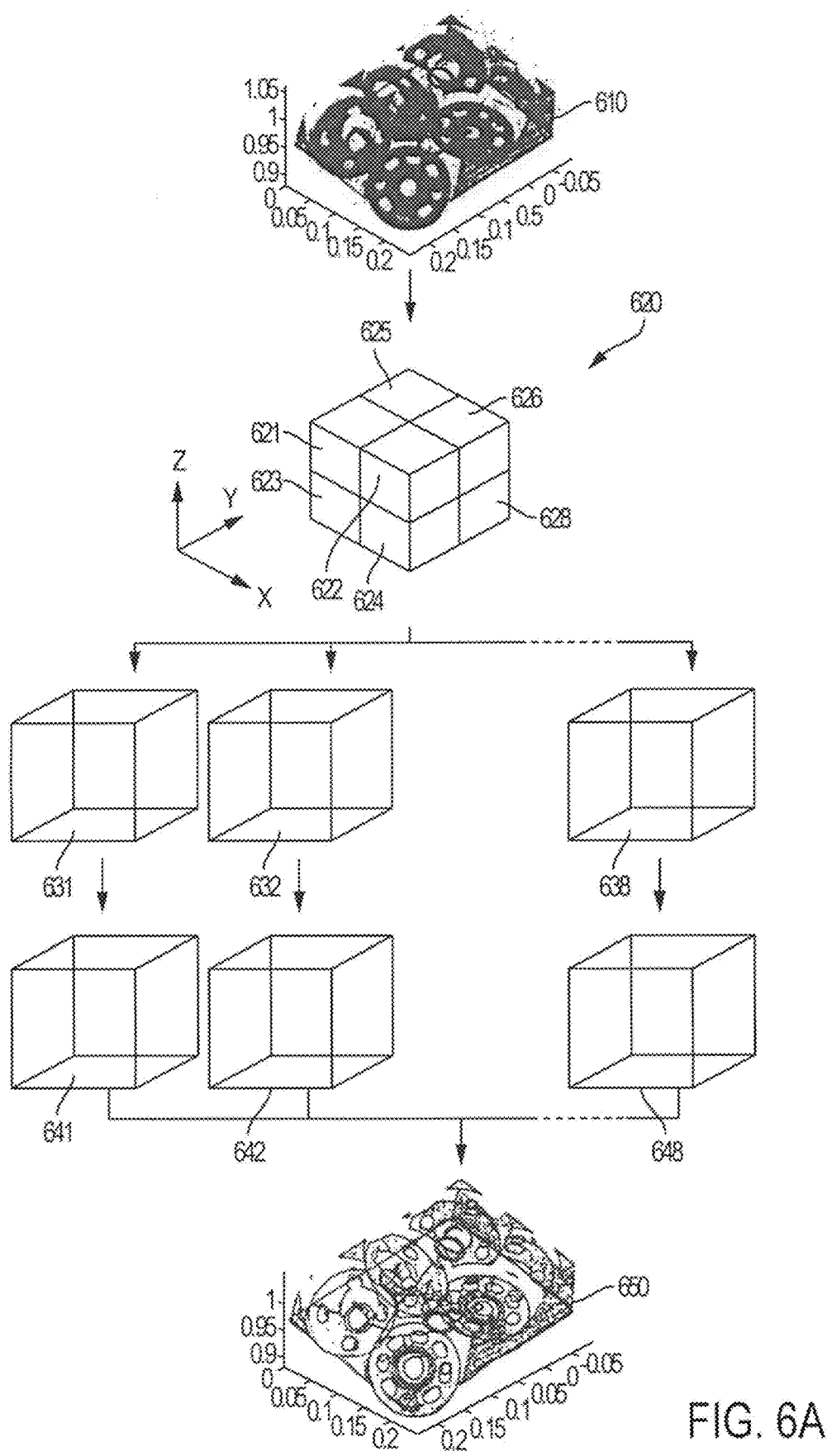
Figures 1, 6B:
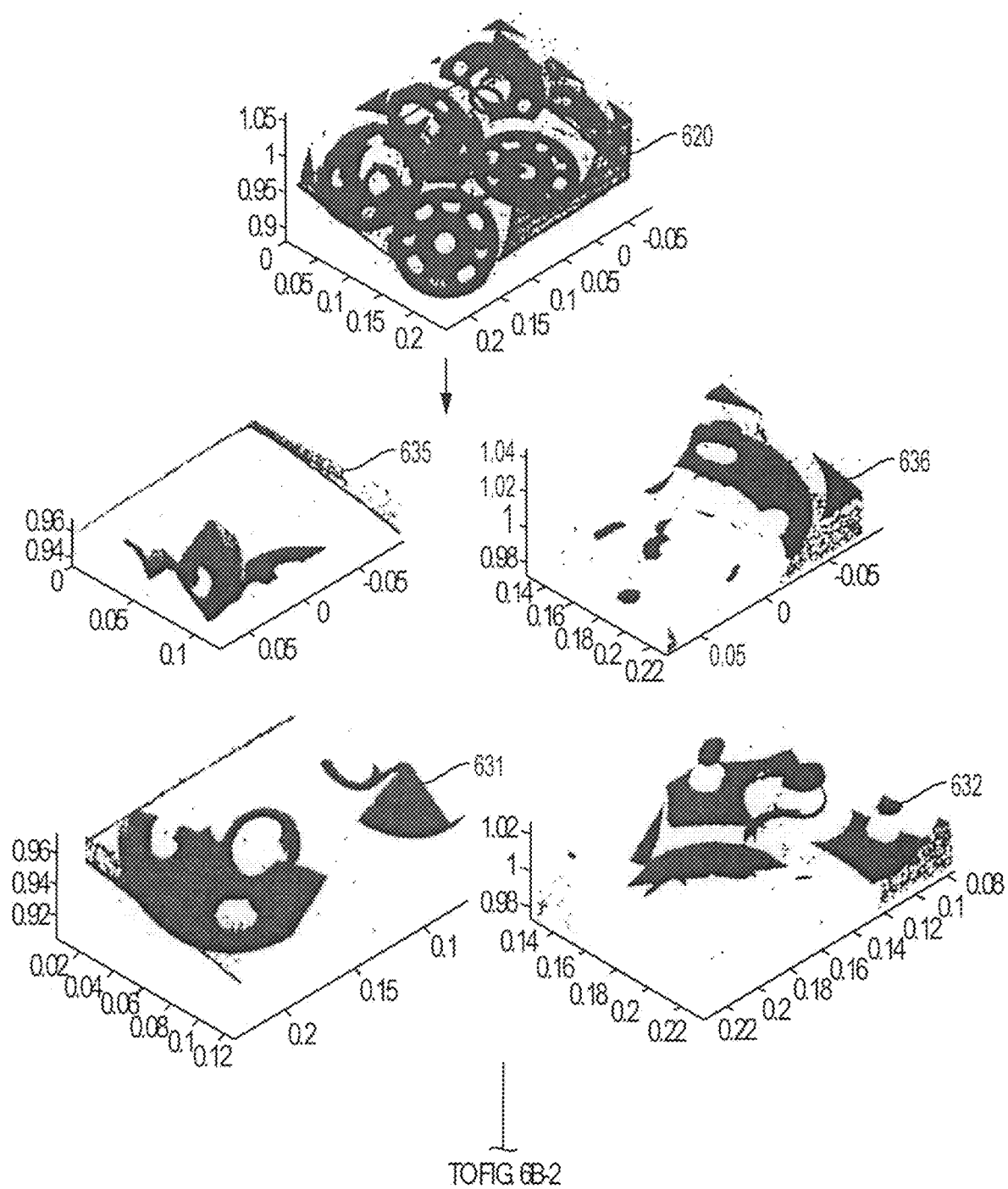
Figures 2, 6B:
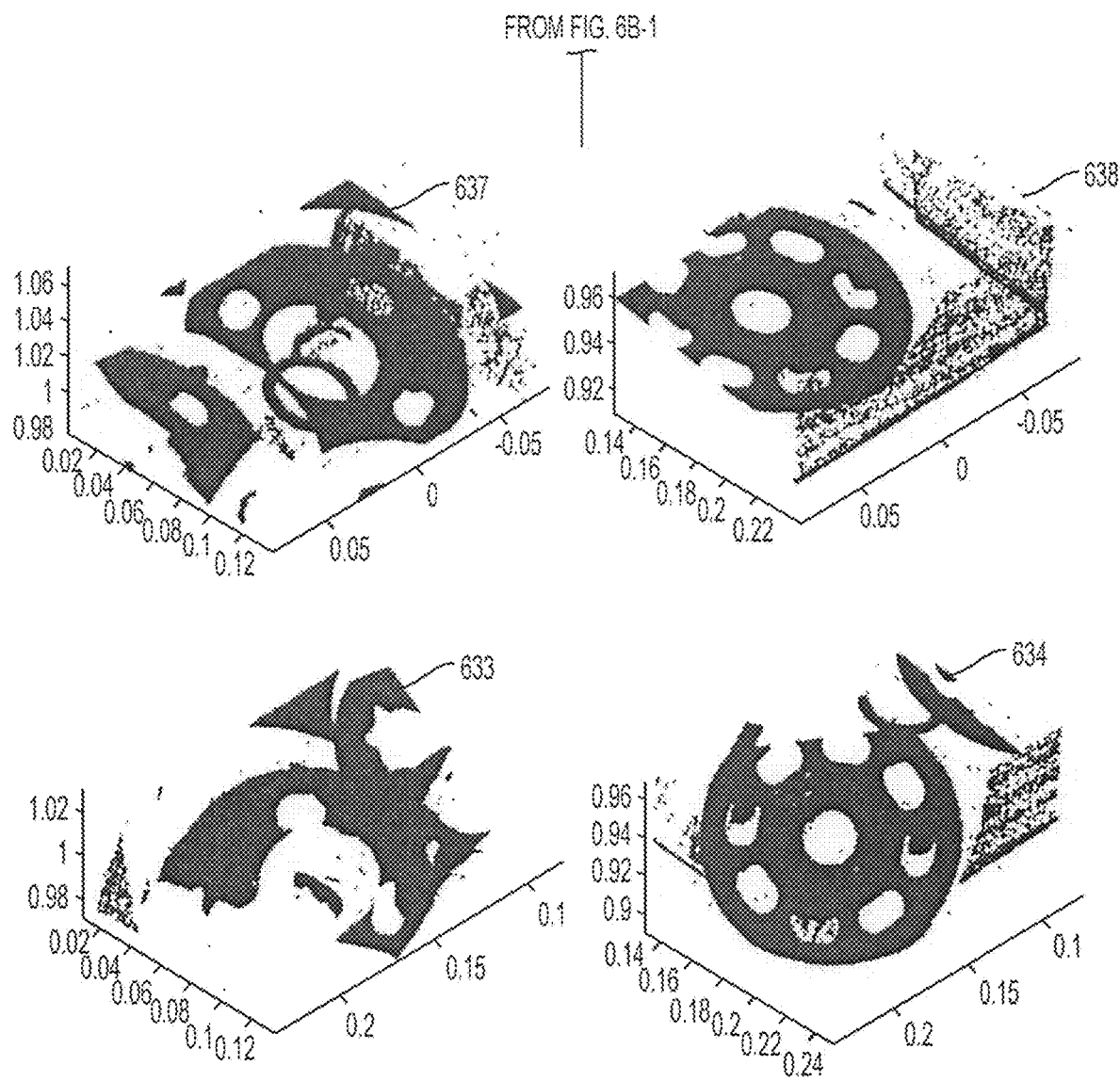
Figures 1, 6C:
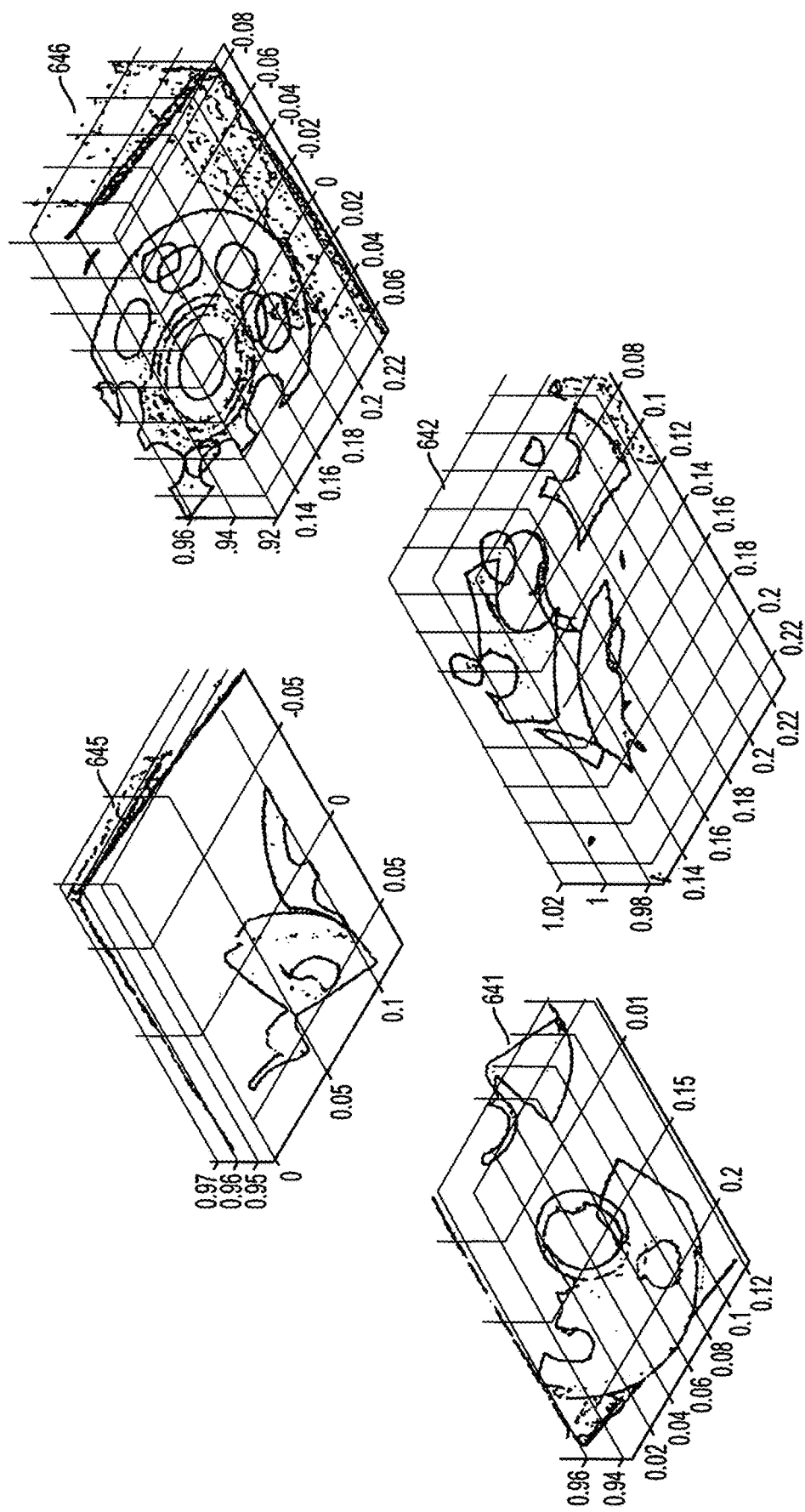
Figures 2, 6C:
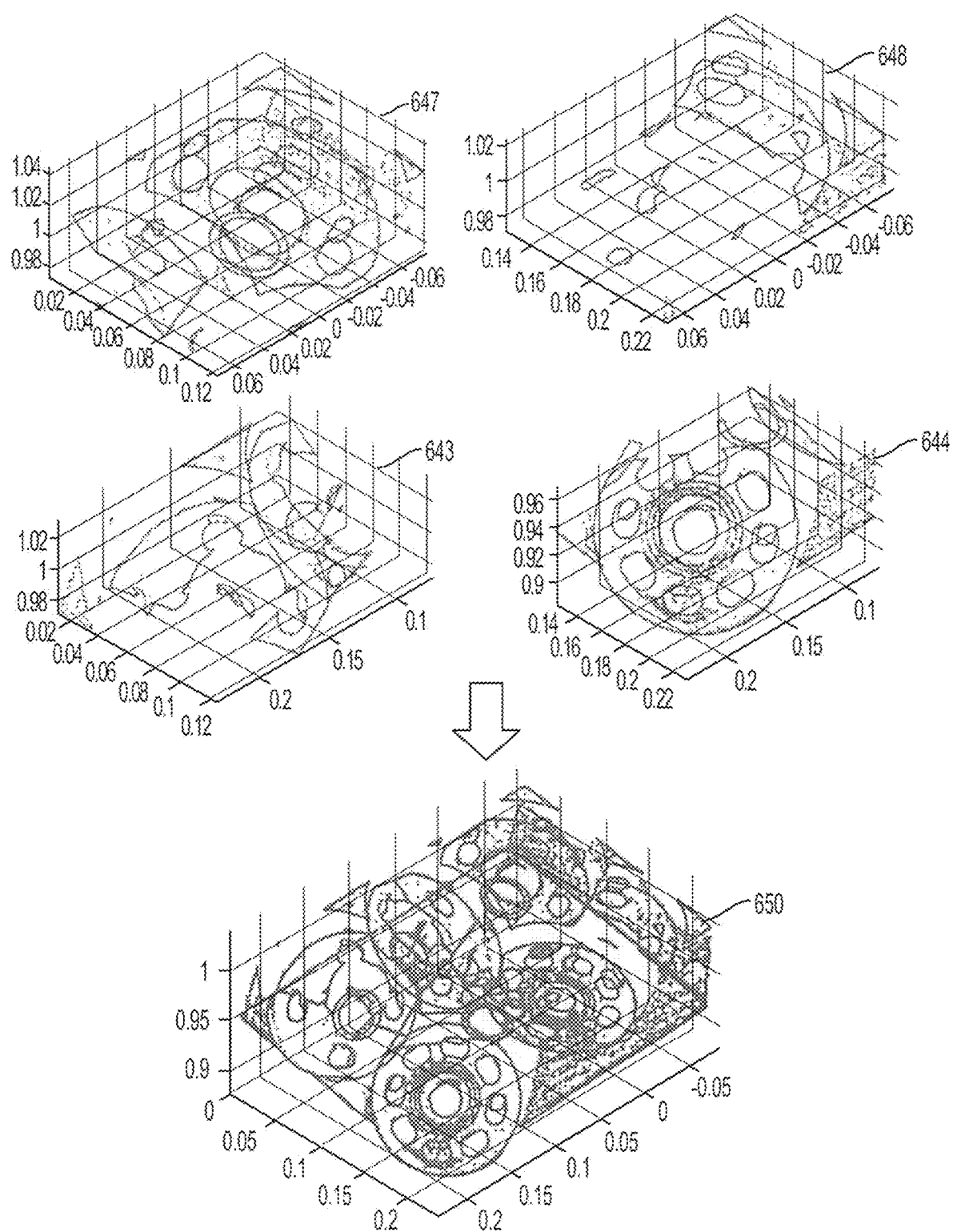

Having generally described object edge image representation generation using block based edgel detection and post edgel detection processing to eliminate false edges according to concepts of the invention above, further detail with respect to exemplary block based edgel detection processing and exemplary post edgel detection processing to eliminate false edges is provided below with reference to FIGS. 4 and 5. In particular, FIG. 4 shows a flow diagram illustrating operation of an image processor providing block based edgel detection processing and FIG. 5 shows a flow diagram illustrating operation of an image processor providing post edgel detection processing to eliminate false edges. The block based edgel detection processing of FIG. 4 and the post edgel detection processing of FIG. 5 of embodiments cooperate to provide processing of image data (e.g., 3D point cloud 610) to generate a corresponding object edge image representation (e.g., object edge image representation 650) as illustrated in FIGS. 6A, 6B-1, 6B-2, 6C-1, and 6C-2.

Referring first to FIG. 4, flow 400 is shown as providing block based edgel detection processing according to embodiments of the invention. For example, flow 400 may provide the block based edgel detection processing functionality of block 202 of the object edge image representation generation processing of FIG. 2.

At block 401 of the embodiment illustrated in FIG. 4, the image data for which an object edge image representation is to be generated is read into block based edgel detection logic of the image processor. For example, a 3D point cloud (e.g., 3D point cloud 610 of FIGS. 6A, 6B-1, and 6B-2) for an image to be processed may be read (e.g., from image data database 114) into block based edgel detection logic 113 of image processor 110. In operation according to embodiments, processing at block 401 by the block based edgel detection logic includes operation to facilitate subdividing the image data for block based edgel detection. For example, the aforementioned 3D point cloud may be prepared for subdivision by quantizing and/or downsampling (e.g., using a random method, grid average method, nonuniform grid sample method, etc.) the points thereof, wherein the quantization and/or downsampling of the points is used according to embodiments to decrease the amount of data of the original point clouds, and at the same time increase the recognition precision as it eliminates the ambiguity of the point's location. Additionally or alternatively, an area or volume (e.g., image volume 620 of FIG. 6A) into which the image data fits is be determined for block based subdivision according to embodiments, such as by analyzing the dimensions of the 3D point cloud in X, Y, and Z directions. For example, the maximum size of the 3D point cloud in X, Y, and Z directions may be determined by block based edgel detection logic 113 to be image data dimensions $L_x$, $L_y$, and $L_z$ respectively.

Parameters for the subdivision of the image volume, and thus the image data, for block based edgel detection are established at block 402 of the illustrated embodiment of flow 400. For example, subdivision parameters M, N, and P, corresponding to the X, Y, and Z directions respectively, may be set by block based edgel detection logic 113 for controlling the number of portions each dimension of image volume 620 is to be divided into. In the example of image volume 620 illustrated in FIG. 6A, subdivision parameters M, N, and P are set as M=N=P=2, whereby 8 sub-blocks (shown as sub-blocks 621-628) are defined for subdivision of the image data. It should be appreciated, however, that the particular subdivision parameters utilized with respect to implementations of a block based edgel detection and post edgel detection processing to eliminate false edges herein may not only be different than the value 2 shown in the example, but the values of any or all of subdivision parameters M, N, and P may set to be different values with respect to each other. It should be appreciated that the values of the subdivision parameters M, N, and P may be selected based on a number of criteria (e.g., selected to provide sub-blocks having a size for optimal processing performance in a particular host processor environment, selected to provide a number of sub-blocks for processing corresponding to the number of processing cores, such as a number not to exceed the number of available processing cores, a particular multiple of the available processing cores, etc.), wherein if the total number of sub-blocks (the product of M, N, and P) is greater than the number of processing cores available in the hose processing environment processing of the sub-blocks may be accomplished in multiple batches according to embodiments. Irrespective of the particular criteria utilized in selecting subdivision parameters M, N, and P of embodiments, each such subdivision parameter is preferably selected as an integer value suitable for facilitating rapid, even real-time, generation of object edge image representations and/or generation of object edge image representations using processor platforms having less computing resources than those required for traditional edge detection techniques.

At block 403 of the embodiment illustrated in FIG. 4, the image data dimensions with respect to the image data are configured for subdivision parameters M, N, and P of the image volume. For example, in operation according to embodiments image data dimensions $L_x$, $L_y$, and $L_z$ determined with respect to the image data are adjusted by block based edgel detection logic 113 to $L'_x$, $L'_y$, and $L'_z$, respectively, for correspondence to subdivision parameters M, N, and P of the image volume, wherein $L'_x$, $L'_y$, and $L'_z$ are selected such that they are individually divisible by a respective one of subdivision parameters M, N and P.

The image data is subdivided into sub-blocks of image data according to the image volume subdivision parameters at block 404 for block based edgel detection according to the illustrated embodiment. For example, 3D point cloud 610 of FIGS. 6A, 6B-1, and 6B-2 is divided into image data sub-blocks 631-638 (e.g., as may be stored in image data database 114 for subsequent edgel detection processing) corresponding to sub-blocks 621-628 of image volume 620 by block based edgel detection logic 113. Accordingly, in accordance with the illustrated example, the dimensions of each image data sub-block of image data sub-blocks 631-638 is $L'_x/M$, $L'_y/N$, and $L'_z/P$.

At block 405 of the illustrated embodiment of flow 400 the image data sub-blocks are processed for edgel detection to produce object edge image representation sub-blocks. For example, each of image data sub-blocks 631-638 of FIGS. 6A, 6B-1, and 6B-2 (e.g., as may be retrieved from image data database 114) may be separately processed for edgel detection to generate corresponding object edge image representation sub-blocks 641-648 of FIGS. 6A, 6C-1, and 6C-2 (e.g., as may be stored in object edge image representation database 116 for subsequent false edge elimination processing and/or combining to form an object edge image representation of the image data). As described above, various edgel detection techniques (e.g., edgel detection as described in Bendels, Gerhard H., Ruwen Schnabel, and Reinhard Klein, "Detecting Holes in Point Set Surfaces," WSCG 2006 International Programme Committee (2006); Hackel, Timo, Jan D. Wegner, and Konrad Schindler, "Contour detection in unstructured 3d point clouds," Proceedings of the IEEE Conference on Computer Vision and Pattern Recognition (2016); Boulaassal, H., T. Landes, and P. Grussenmeyer, "Automatic extraction of planar clusters and their contours on building façades recorded by terrestrial laser scanner," International Journal of Architectural Computing 7.1, pp 1-20, (2009); and Ni, Huan, et al., "Edge detection and feature line tracing in 3d-point clouds by analyzing geometric properties of neighborhoods," Remote Sensing 8.9, p. 710, (2016)) may be utilized for generating a corresponding object edge image representation sub-block from each of the image data sub-blocks according to embodiments of the invention.

Processing of a plurality of image data sub-blocks for edgel detection is performed in parallel according to embodiments of the invention. For example, each of image data sub-blocks 631-638 may be provided to a separate processing unit (e.g., separate processors, processor cores of a multicore processor, etc.) for edgel detection, whereby each such processing unit generates a corresponding one of object edge image representation sub-blocks 641-648. Alternatively, some portion of the image data sub-blocks may be processed for edgel detection in parallel (e.g., a number of image data sub-blocks corresponding to a row, column, or layer of image volume 620 used to subdivide the point cloud, a number of image data sub-blocks corresponding to an available number of processing units, etc.), whereby some or all of the processing units may be utilized to generate more than one object edge image representation sub-block. Parallel processing for edgel detection according to embodiments of the invention facilitates rapid, even real-time, generation of object edge image representations by distributing the often resource intensive processing of the image data among a plurality of processing units.

In addition to, or in the alternative to, the aforementioned parallel edgel detection processing, embodiments of the invention may perform processing of a plurality of image data sub-blocks for edgel detection serially. For example, in the above example where only a portion of the image data sub-blocks are processed for edgel detection in parallel (e.g., where point cloud 610 is subdivided into 8 image data sub-blocks and only 4 processing units are available for edgel detection processing), a processing unit may perform edgel detection processing of a first image data sub-block (e.g., image data sub-block 631) to generate its corresponding object edge image representation sub-block (e.g., object edge image representation sub-block 641) and thereafter perform edgel detection of a second image data sub-block (e.g., image data sub-block 633) to generate its corresponding object edge image representation sub-block (e.g., object edge image representation sub-block 643). As another example of serial edgel detection processing, embodiments may utilize a same processing unit to perform edgel detection processing with respect to all the image data sub-blocks (e.g., each of image data sub-blocks 631-638), one after the other. Such embodiments facilitate generation of object edge image representations using processor platforms having less computing resources (e.g., processing units of lesser capability, lower performance, etc.) than those required for traditional edge detection techniques in light of the processing unit only needing sufficient resources for processing a sub-block of the image data at any particular time.

The edgel detection processing provided according to embodiments of the invention not only provides detection of edges within the images but is further configured to facilitate elimination of false edges through post edgel detection processing. For example, the edgel detection processing performed at block 405 of embodiments of flow 400 may operate to record (e.g., within object edge image representation database 116) the location (e.g., coordinates within the point cloud of edgel points or pixels) and normal (e.g., surface normal at the edgel point or pixel location) of each edgel point detected in the image data sub-blocks. In operation according to embodiments, if an edgel point is on the edge of a surface the surface's normal is used to represent the point's normal and if an edgel voxel is on the edge of a 3D thin stick a predetermined value (e.g., 0) is used to represent the point's normal.

Referring now to FIG. 5, flow 500 is shown as providing post edgel detection processing to eliminate false edges according to embodiments of the invention. For example, flow 500 may provide the combining of edgel processed sub-blocks for forming an object edge image representation of the image data using a false edge elimination process functionality of block 203 of the object edge image representation generation processing of FIG. 2.

Figure 7:
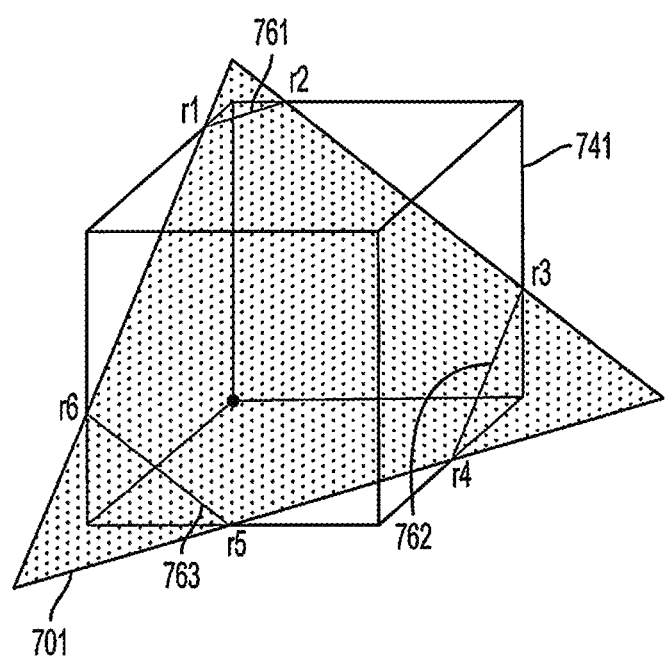
FIG. 7 shows false edges on a sub-block border as may be introduced by block based edgel detection of embodiments of the invention.

The use of block based edgel detection according to embodiments may introduce false edges on a sub-block border (e.g., caused by the subdivision of the image data), as illustrated in FIG. 7. For example, an object (e.g., object 701) may extend beyond the area of a sub-block (e.g., sub-block 741, such as may correspond to any of object edge image representation sub-blocks 641-648) for which edgel detection is performed, wherein edgels may be detected where a portion of the object interfaces with the edge of the sub-block (these edgels being referred to as border edgel points). This may result in one or more false edges (e.g., false edges 761-763) being present in object edge image representation sub-blocks generated by a block based edgel detection technique of embodiments of the invention. Accordingly, post edgel detection processing is provided according to embodiments of the invention to avoid false edges being deemed as real edge, and is operable to remove the false edges where the border edgel points are caused by the subdivision of the image data for edgel detection. For example, the false edge elimination algorithm implemented by flow 500 illustrated in FIG. 5 is applied in recombining the object edge image representation sub-blocks resulting from the sub-block edgel detection processing to eliminate false edge artifacts associated with use of block based edgel detection according to some embodiments herein.

At block 501 of the embodiment illustrated in FIG. 5, combining of the edgel detection processed sub-blocks (e.g., object edge image representation sub-blocks 641-648 as generated by flow 400 of FIG. 4, and as may be retrieved from object edge image representation database 116) for forming an object edge image representation of the image data is initiated. Accordingly, in the illustrated embodiment all empty object edge image representation sub-blocks (e.g., any of object edge image representation sub-blocks 641-648 having no, or less than some threshold amount of, edgel points identified therein) are marked as "combined" to avoid unnecessary further processing with respect to such empty sub-blocks. However, all non-empty object edge image representation sub-blocks (e.g., any of object edge image representation sub-blocks 641-648 having any, or more than some threshold amount of, edgel points identified therein) are marked as "uncombined" for further processing by the false edge elimination algorithm implemented by flow 500.

In operation according to flow 500 of the illustrated embodiment, an object edge image representation sub-block of the image data is selected at block 502 as the base for the object edge image representation. For example, any non-empty object edge image representation sub-block (e.g., any sub-block of object edge image representation sub-blocks 641-648 having edgel points identified therein) may be the base (e.g., arbitrary initial sub-block for combining, wherein the size of the base will increase as more and more edgel points from other sub-blocks are added to it) for the object edge image representation (e.g., object edge image representation 650) to be generated from the combined object edge image representation sub-blocks. If all the object edge image representation sub-blocks are empty, operation according to block 502 may select any one of the empty sub-block as the base.

In operation according to embodiments, the object edge image representation sub-block selected as the base is marked as "combined". The point set of edgel points in the base is denoted as PSbase in accordance with the illustrated embodiment.

At block 503 of the illustrated embodiment a determination is made as to whether any uncombined object edge image representation sub-blocks remain to be combined through operation of flow 500. If no uncombined object edge image representation sub-blocks remain to be combined, combining of edgel processed sub-blocks for forming an object edge image representation of the image data using a false edge elimination process according to the illustrated embodiment concludes and flow 500 is ended (e.g., processing may proceed to block 204 of FIG. 2). However, if uncombined object edge image representation sub-blocks remain to be combined, processing according to the illustrated embodiment of flow 500 proceeds to block 504 for selection of an uncombined object edge image representation sub-block for combining with the base.

In operation according to embodiments of flow 500, sub-blocks of the object edge image representation sub-blocks having edgel points identified therein are combined with the base to combine the sub-blocks for forming the object edge image representation of the image data. Accordingly, at block 504 an uncombined object edge image representation sub-block (e.g., one of object edge image representation sub-blocks 641-648 sharing a side with the base and which is not already combined or otherwise marked as "combined") is selected for combining with the base.

As discussed above, false edges may be present where a portion of an object represented in the image data interfaces with the edge of an image data sub-block. However, real or true edges may likewise be present on the edge of an image data sub-block. To avoid real edge being deemed as false edge, processing according to the illustrated embodiment of flow 500 performs analysis to determine if border edgel points should be removed or combined with the base for forming the object edge image representation.

In performing processing to determine if border edgel points should be removed or combined with the base according to the illustrated embodiment of flow 500, a determination is made regarding whether edgel points in the object edge image representation sub-block selected for combining with the base remain to be processed for combining at block 505. If it is determined that no edgel points of the selected object edge image representation sub-block remain to be processed, processing according to the illustrated embodiment proceeds to block 506 wherein the selected object edge image representation sub-block is marked as "combined" and processing returns to block 503 to determine if any uncombined object edge image representation sub-blocks remain. If, however, it is determined that edgel points of the selected object edge image representation sub-block remain to be processed, processing according to the illustrated embodiment proceeds to block 507 for further processing to determine if the edgel points of the selected object edge image representation sub-block that have not already been processed should be removed or combined with the base.

At block 507 of the illustrated embodiment, an edgel point of the selected object edge image representation sub-bock which has not yet been processed for removal or combining with the base is selected. Accordingly, a next edgel point is selected for further processing to determine if that edgel point should be removed or combined with the base according to embodiments of the invention. The edgel point may be selected randomly from those of the object edge image representation sub-block that remain unprocessed, may be selected in sequence using a predetermined coordinate pattern to traverse all points within the object edge image representation sub-block, etc.

Irrespective of how the next edgel point to be processed is selected, processing with respect to the selected edgel point for facilitating application of a false edge elimination algorithm of embodiments may be performed in accordance with operation at block 507 of flow 500. For example, the selected edgel point may be denoted as Pe and its 3D location denoted as LPe. Further, the normal of the selected edgel point may be denoted as NPe.

A determination is made at block 508 as to whether the selected edgel point Pe is disposed at an edge of one or more surfaces. For example, if the selected edgel point Pe is disposed at the border of one or more surfaces, the normal NPe of the selected edgel point Pe will be greater than a selected threshold value, $\varepsilon 1$ (e.g., a tunable small threshold value, such as in the range of $[0, 0.02\pi]$. If it is determined at block 508 that the selected edgel point Pe is not disposed at an edge of one or more surfaces (e.g., $|NPe| \le \varepsilon 1$) processing according to the illustrated embodiment proceeds to block 509 to add the selected edgel point Pe to the base. However, if it is determined that the selected edgel point Pe is disposed at an edge of one or more surfaces (e.g., $|NPe| > \varepsilon 1$) processing according to the illustrated embodiment proceeds to block 510 for further processing to determine if the selected edgel point should be removed or combined with the base.

At block 510 a determination is made as to whether the selected edgel point Pe has any neighboring edgel points in the base. In operation according to embodiments the selected edgel point's location LPe may be used as a center to look for a neighbor point set PSx of neighboring edgel points Px in the base point set PSbase. For example, for each edgel point Px∈PSx ⊂ PSbase, its location LPx should fulfill $|LPx-LPe| < \varepsilon 2$, where $\varepsilon 2$ is a selected threshold value (e.g., a tunable threshold value, such as in the range of [0, 4 precision units], wherein one precision unit is the minimum precision of the captured point clouds, or the minimum precision of downsampled point clouds). If it is determined at block 510 that the selected edgel point Pe has no neighboring edgel points Px in the base (e.g., the element number of set NPx=0) processing according to the illustrated embodiment proceeds to block 509 to add the selected edgel point Pe to the base. However, if it is determined that the selected edgel point Pe has one or more neighboring edgel points Px in the base (e.g., the element number of set PSx, NPx, is greater than 0) processing according to the illustrated embodiment proceeds to block 511 for further processing to determine if the selected edgel point should be removed or combined with the base.

A determination is made at block 511 as to whether the neighboring edgel points Px (e.g., edgel points of the neighbor point set PSx determined to neighbor the selected edgel point Pe) are disposed at an edge of one or more surfaces. For example, if the neighbor edgel points Px are disposed at the border of one or more surfaces, the normal NPx of the neighbor edgel points Px will be greater than a selected threshold value, $\varepsilon 3$ (e.g., a tunable small threshold value, such as in the range of $[0, 0.02\pi]$). In operation according to embodiments, a normal value representing the normal for the point set PSx, or some portion of points thereof, may be used in determining whether the neighboring edgel points are disposed at an edge of one or more surfaces. For example, the average normals of the point set PSx, denoted as NPSx, may be calculated for use in determining if the neighboring points are disposed at an edge of a surface. If it is determined at block 511 that the neighbor edgel points Px are not disposed at an edge of one or more surfaces (e.g., $|NPSx| \le \varepsilon 3$) processing according to the illustrated embodiment proceeds to block 509 to add the selected edgel point Pe to the base. However, if it is determined that the neighbor edgel points Px is disposed at an edge of one or more surfaces (e.g., $|NPSx| > \varepsilon 3$) processing according to the illustrated embodiment proceeds to block 512 for further processing to determine if the selected edgel point should be removed or combined with the base.

At block 512 a determination is made as to whether the selected edgel point Pe and the neighboring edgel points Px are part of a same surface. For example, if the normals of the selected edgel point Pe and the neighboring edgel points Px are the same, or within some preselected threshold amount $\varepsilon 4$ (e.g., a tunable small threshold value, such as in the range of $[0, 0.01\pi]$), the selected edgel point Pe and the neighboring edgel points Px may be determined to be part of a same surface. If it is determined at block 512 that the selected edgel point Pe and the neighbor edgel points Px are not part of a same surface (e.g., $|NPSx-NPe| \le \varepsilon 4$) processing according to the illustrated embodiment proceeds to block 509 to add the selected edgel point Pe to the base. However, if it is determined that the selected edgel point Pe and the neighbor edgel points Px are part of a same surface (e.g., $|NPSx-NPe| > \varepsilon 4$) processing according to the illustrated embodiment proceeds to block 513 for processing to remove the selected edgel point Pe so that it is not added to the base and to remove neighboring edgel points Px from the base.

In operation according to the illustrated embodiment of flow 500, after either adding the selected edgel point Pe to the base (block 509) or removing the selected edge point Pe so that it is not added to the base (block 513), processing proceeds to block 514 to mark the selected edgel point Pe as processed. Thereafter, processing according to the illustrated embodiment returns to block 505 for a determination regarding whether edgel points in the object edge image representation sub-block selected for combining with the base remain to be processed for combining.

It can be appreciated from the foregoing that the false edge elimination algorithm implemented by flow 500 illustrated in FIG. 5 implements a rule set to eliminate false edges (e.g., false edges on an object edge image representation sub-block border) resulting from the subdivision of the block based detection of edgels while avoiding deeming real or true edges as false edges. In particular, the false edge elimination rules of the exemplary embodiment operate to keep edges that are disposed in the interior of an object edge image representation sub-block, to keep real edges that are disposed on an edge or border of an object edge image representation sub-block, and yet remove false edges that are disposed on an edge or border of an object edge image representation sub-block. In operation to keep real edges and remove false edges, the exemplary embodiment operates to keep edges of a line (e.g., a line on the edge or border of an object edge image representation sub-block is retained, adjacent lines on the edge or borders of two adjacent object edge image representation sub-blocks are retained, and a line on the edge or border of an object edge image representation sub-block that is adjacent to an edge of a surface in an adjacent object edge image representation sub-block is retained), to keep edges of different surfaces (e.g., a surface edge on the edge or border of an object edge image representation sub-block that is adjacent to an edge of a different surface in an adjacent object edge image representation sub-block is retained), and to remove edges of same surfaces (e.g., a surface edge on the edge or border of an object edge image representation sub-block that is adjacent to an edge of a same surface in an adjacent object edge image representation sub-block is removed).

The foregoing exemplary embodiments operable to provide object edge image representation generation using block based edgel techniques implementing post edgel detection processing to eliminate false edges facilitate rapid generation of object edge image representations with efficient use of computing resources. In a comparison of generation of an object edge image representation generated using a traditional, non-block-based technique (e.g., the full image 3D point cloud processed for edgel detection) and generation of an object edge image representation generated using the block-based technique herein (e.g., the image 3D point cloud processed in sub-blocks, wherein the subdivision parameters M, N, and P were selected to be 2, and combined using a false edge elimination algorithm), the block-based technique implemented in accordance with the concepts herein was found to be 2.7 times faster than the traditional technique. The foregoing improvement in the time to generate an object edge image representation is realized even in light of the two techniques utilizing the same edgel detection core technique and providing the same accuracy with respect to edge detection. Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for generating an object edge image representation from an image data set, the method comprising:
    subdividing the image data set into a plurality of image data sub-blocks, wherein the subdividing is agnostic with respect to objects represented within the image data such that the image data sub-blocks are arbitrary with respect to the objects;
    separately performing edgel detection with respect to image data of each image data sub-block of the plurality of image data sub-blocks to generate a plurality of object edge image representation sub-blocks, wherein each image data sub-block of the plurality of image data sub-blocks has a corresponding object edge image representation sub-block of the plurality of object edge image representation sub-blocks; and
    combining the object edge image representation sub-blocks of the plurality of object edge image representation sub-blocks using false edge elimination processing to generate the object edge image representation, wherein the combining the object edge image representation sub-blocks of the plurality of object edge image representation sub-blocks using false edge elimination processing comprises:
        selecting a non-empty object edge image representation sub-block of the plurality of object edge image representation sub-blocks as a base, for the object edge image representation; and
        using the false edge elimination processing to determine whether to eliminate an edgel point of a remaining object edge image representation sub-block of the plurality of object edge image representation sub-blocks or to add the edgel point of the remaining object edge image representation sub-block to the base, wherein the false edge elimination processing is iteratively applied to each remaining object edge image representation sub-block of the plurality of object edge image representation sub-blocks for combining the plurality of object edge image representation sub-blocks to generate the object edge image representation; and
    wherein the false edge elimination processing comprises:
        determining a surface normal value for the edgel point of the remaining object edge image representation sub-block;
        determining edgel points within the base neighboring the edgel point of the remaining object edge image representation sub-block;
        determining an average surface normal value for the edgel points within the base neighboring the edge point of the remaining object edge image representation sub-block; and
        either removing the edgel point of the remaining object edge image representation sub-block without adding it to the base if a difference between the surface normal value and the average surface normal value is less than or equal to a threshold value or adding the edgel point of the remaining object edge image representation sub-block to the base if a difference between the surface normal value and the average surface normal value is greater than a threshold value.

2. The method of claim 1, wherein each image data sub-block of the plurality of image data sub-blocks is of equal size.

3. The method of claim 1, wherein the subdividing the image data set into a plurality of image data sub-blocks comprises:
    determining an image volume into which the image data fits; and
    setting subdivision parameters M, N, and P for controlling a number of portions each dimension of the image volume is to be divided into to provide the plurality of image data sub-blocks.

4. The method of claim 1, wherein the separately performing edgel detection with respect to image data of each image data sub-block of the plurality of image data sub-blocks comprises:
    performing edgel detection with respect to image data of two or more of the image data sub-blocks of the plurality of image data sub-blocks in parallel.

5. The method of claim 4, wherein the performing edgel detection with respect to image data of two or more of the image data sub-blocks of the plurality of image data sub-blocks in parallel comprises:

performing edgel detection with respect to image data of each of the image data sub-blocks of the plurality of image data sub-blocks in parallel.

6. The method of claim 4, wherein the separately performing edgel detection with respect to image data of each image data sub-block of the plurality of image data sub-blocks comprises:
performing edgel detection with respect to image data of two or more of the image data sub-blocks of the plurality of image data sub-blocks serially.

7. A system for generating an object edge image representation from an image data set, the system comprising:
at least one processor; and
memory coupled to the at least one processor, wherein the at least one processor is configured with logic to:
subdivide the image data set into a plurality of image data sub-blocks, wherein subdividing of the image data set is agnostic with respect to objects represented within the image data such that the image data sub-blocks are arbitrary with respect to the objects;
separately perform edgel detection with respect to image data of each image data sub-block of the plurality of image data sub-blocks to generate a plurality of object edge image representation sub-blocks, wherein each image data sub-block of the plurality of image data sub-blocks has a corresponding object edge image representation sub-block of the plurality of object edge image representation sub-blocks; and
combine the object edge image representation sub-blocks of the plurality of object edge image representation sub-blocks using false edge elimination processing to generate the object edge image representation, wherein the logic to combine the object edge image representation sub-blocks of the plurality of object edge image representation sub-blocks using false edge elimination processing comprises logic to:
select a non-empty object edge image representation sub-block of the plurality of object edge image representation sub-blocks as a base for the object edge image representation; and
use false edge elimination processing logic to determine whether to eliminate an edgel point of a remaining object edge image representation sub-block of the plurality of object edge image representation sub-blocks or to add the edgel point of the remaining object edge image representation sub-block to the base, wherein the false edge elimination processing is iteratively applied to each remaining object edge image representation sub-block of the plurality of object edge image representation sub-blocks for combining the plurality of object edge image representation sub-blocks to generate the object edge image representation; and
wherein the false edge elimination processing logic comprise logic to:
determine a surface normal value for the edgel point of the remaining object edge image representation sub-block;
determine edgel points within the base neighboring the edgel point of the remaining object edge image representation sub-block;
determine an average surface normal value for the edgel points within the base neighboring the edge point of the remaining object edge image representation sub-block; and
either remove the edgel point of the remaining object edge image representation, sub-block without adding it to the base if a difference between the surface normal value and the average surface normal value is less than or equal to a threshold value or add the edgel point of the remaining object edge image representation sub-block to the base if a difference between the surface normal value and the average surface normal value is greater than a threshold value.

8. The system of claim 7, wherein each image data sub-block of the plurality of image data sub-blocks is of equal size.

9. The system of claim 7, wherein the logic to subdivide the image data set into a plurality of image data sub-blocks comprises logic to:
determine an image volume into which the image data fits; and
set subdivision parameters M, N, and P for controlling a number of portions each dimension of the image volume is to be divided into to provide the plurality of image data sub-blocks.

10. The system of claim 7, wherein the logic to separately perform edgel detection with respect to image data of each image data sub-block of the plurality of image data sub-blocks comprises logic to:
perform edgel detection with respect to image data of two or more of the image data sub-blocks of the plurality of image data sub-blocks in parallel.

11. The system of claim 10, wherein the logic to perform edgel detection with respect to image data of two or more of the image data sub-blocks of the plurality of image data sub-blocks in parallel comprises logic to:
perform edgel detection with respect to image data of each of the image data sub-blocks of the plurality of image data sub-blocks in parallel.

12. The system of claim 10, wherein the logic to separately performing edgel detection with respect to image data of each image data sub-block of the plurality of image data sub-blocks comprises logic to:
perform edgel detection with respect to image data of two or more of the image data sub-blocks of the plurality of image data sub-blocks serially.

13. A method for generating an object edge image representation from an image data set, the method comprising:
subdividing the image data set into a plurality of image data sub-blocks, wherein the subdividing is agnostic with respect to objects represented within the image data such that the image data sub-blocks are arbitrary with respect to the objects;
separately performing edgel detection with respect to image data of each image data sub-block of the plurality of image data sub-blocks to generate a plurality of object edge image representation sub-blocks, wherein each image data sub-block of the plurality of image data sub-blocks has a corresponding object edge image representation sub-block of the plurality of object edge image representation sub-blocks; and
combining the object edge image representation sub-blocks of the plurality of object edge image representation sub-blocks to generate the object edge image representation by:
selecting a non-empty object edge image representation sub-block of the plurality of object edge image representation sub-blocks as a base for the object edge image representation;

selecting a remaining non-empty object edge image representation sub-block of the plurality of object edge image representation sub-blocks for adding edgel points to the base; and performing false edge elimination processing when combining edgel points of the selected remaining non-empty object edge image representation sub-block with the base by:

determining a surface normal value for an edgel point of the selected non-empty object edge image representation sub-block;

determining edgel points within the base neighboring the edgel point of the selected remaining non-empty object edge image representation sub-block;

determining an average surface normal value for the edgel points within the base neighboring the edge point of the selected remaining non-empty object edge image representation sub-block;

either removing the edgel point of the selected remaining non-empty object edge image representation sub-block without adding it to the base if a difference between the surface normal value and the average surface normal value is less than or equal to a threshold value or adding the edgel point of the selected remaining non-empty object edge image representation sub-block to the base if a difference between the surface normal value and the average surface normal value is greater than a threshold value; and repeating the performing false edge elimination processing for at least each edgel point disposed on a border of the selected remaining non-empty object edge image representation sub-block;

repeating the selecting a remaining non-empty object edge image representation sub-block and performing false edge elimination processing for each remaining non-empty object edge image representation sub-block of the plurality of object edge image representation sub-blocks; and outputting the base having edgel points from one or more of the remaining non-empty object edge image representation sub-blocks as the object edge image representation.

14. The method of claim 13, wherein the subdividing the image data set into a plurality of image data sub-blocks comprises:

determining an image volume into which the image data fits; and setting subdivision parameters M, N, and P for controlling a number of portions each dimension of the image volume is to be divided into to provide the plurality of image data sub-blocks.

15. The method of claim 13, wherein the separately performing edgel detection with respect to image data of each image data sub-block of the plurality of image data sub-blocks comprises:

performing edgel detection with respect to image data of the image data sub-blocks of the plurality of image data sub-blocks in parallel.

\* \* \* \* \*

UNITED STATES PATENT AND TRADEMARK OFFICE
CERTIFICATE OF CORRECTION

PATENT NO. : 10,510,148 B2  
APPLICATION NO. : 15/845846  
DATED : December 17, 2019  
INVENTOR(S) : Tian Qiu Page 1 of 1

It is certified that error appears in the above-identified patent and that said Letters Patent is hereby corrected as shown below:

In the Claims

Column 14, Claim 1, Line 8, delete "base, for the object" and replace with --base for the object--.
Column 15, Claim 7, starting at Line 56, delete "comprise logic" and replace with --comprises logic--.
Column 15, Claim 7, starting at Line 59, delete "sub-block:" and replace with --sub-block;--.
Column 15, Claim 7, Line 63, delete "sub-block:" and replace with --sub-block;--.
Column 16, Claim 7, Line 2, delete "representation, sub-block" and replace with --representation sub-block--.

Signed and Sealed this  
Twelfth Day of May, 2020

Andrei Iancu  
*Director of the United States Patent and Trademark Office*